Aug. 16, 1960
H. E. TRACY
2,949,321
MECHANICAL SEAL FOR LIQUID OXYGEN PUMP
Filed Jan. 28, 1957
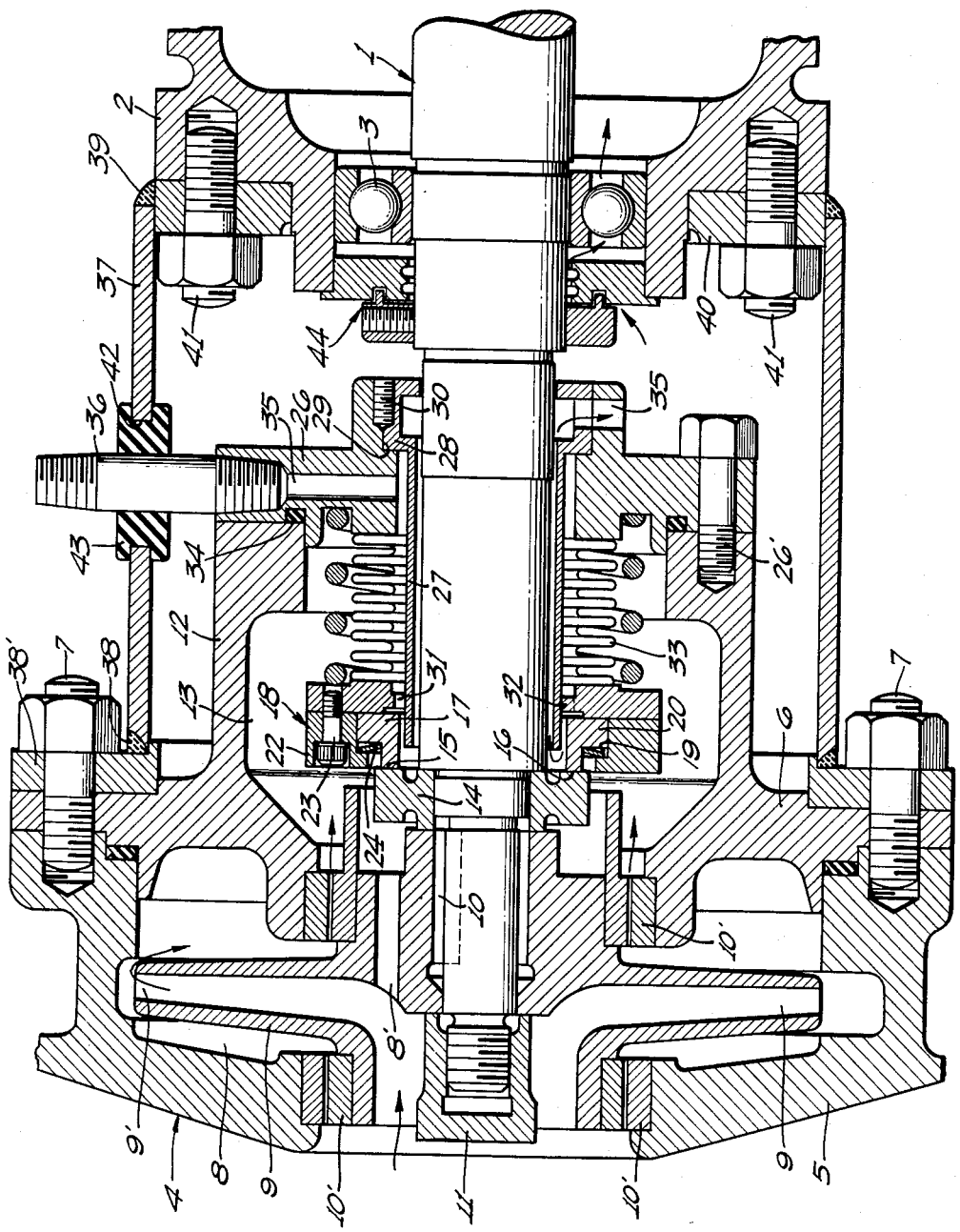
HERBERT E. TRACY
INVENTOR.
BY
*Allen E. Hornby*
ATTORNEY ས
United States Patent Office 2,949,321
Patented Aug. 16, 1960

2,949,321
MECHANICAL SEAL FOR LIQUID OXYGEN PUMP

Herbert E. Tracy, Alhambra, Calif., assignor to Borg-Warner Corporation, Chicago, Ill., a corporation of Illinois Filed Jan. 28, 1957, Ser. No. 636,613

14 Claims. (Cl. 286—9)

The present invention relates to mechanical seals and more particularly to an improved mechanical sealing structure and arrangement of parts for use in conjunction with a pump which is subjected to extremely low temperatures.

In pumping liquid oxygen and other fluids which have an extremely high rate of evaporation and which subject the pump and pump seals to extremely low temperatures, say on the order of about —300° F., difficulties are encountered in the provision of effective sealing means. Any moisture-containing atmosphere finding its way to the sealing means immediately causes the formation of ice due to condensation of the moisture at such cold temperatures.

Ice formations on the sealing surfaces of seals obviously render the seals ineffective, substantially hampering pumping operations and possibly requiring costly and troublesome shutdowns for seal repair or replacement.

A primary object of the present invention is to provide sealing means for a pump which is subjected to low temperatures which would ordinarily cause condensation and freezing of any moisture in the atmosphere reaching the sealing means.

Another object is to provide mechanical sealing means for sealing a rotatable shaft against the leakage of fluid therealong wherein the mechanical sealing elements are protected against contact with moisture-bearing atmosphere.

Another serious problem encountered in the provision of an effective seal in installations where low temperatures are involved is the differential in the coefficients of expansion of the materials of which the sealing elements and the parts to be sealed are composed. Practice and experience indicate that in mechanical seal structures, one of the relatively rotatable rings or sealing elements should preferably be composed of carbon which has for all practical purposes a zero coefficient of expansion. On the other hand, adjacent or contiguous parts may be made of stainless steel, bronze, or other materials having different coefficients of expansion. In such circumstances, warpage or destruction of adjacent parts when they are subjected to temperatures ranging downwardly to —300° F. or below is a serious problem.

Accordingly, another salient feature of the invention is to provide means for compensating for differences in the coefficients of expansion of the sealing parts whereby stainless steel or other metalic supporting structure may be employed in conjunction with the conventional carbon sealing ring.

Still another object is to provide a mechanical seal structure for use on pump shafts or the like wherein the sealing elements are bathed at one side in the pump fluid and wherein at the other side, the sealing elements are subjected to a flushing action from a moisture-free fluid, thus completely isolating the seal structure from moisture-containing atmosphere whereby the formation of ice on the sealing elements is effectively precluded.

A further object is to provide a mechanical seal structure including a sealing element mounted upon a rotary shaft for rotation therewith, a relatively stationary sealing ring being disposed in contiguous relation to the sealing element, and supporting means for said sealing ring wherein the supporting means includes an annular collar having a peripheral channel, the sealing ring having a peripheral flange freely projecting into the channel in said collar with a spring interposed between the flange and one side wall of the channel so as to urge the flange into engagement with the collar at the other side of the channel, thus enabling differential expansion and contraction of the seal parts responsive to extreme temperature variations.

Specifically, an object of the invention is to provide a mechanical seal structure for use in sealing a pump shaft or the like wherein a rotatable sealing ring or disc is carried by the pump shaft for rotation therewith, and wherein a sealing ring or element is mounted for axial movement into engagement with the first mentioned sealing ring or element, the mounting means for the axially moveable sealing ring or element comprising an annular cage, this cage being centered upon a sleeve which is disposed about the pump shaft in spaced relation thereto. A bellows or other flexible, impervious element such as a diaphragm is connected at one end to the cage and to a stationary part of the housing at the other end, thereby defining a closed passage-way between the bellows and the sleeve aforesaid. A dry gas may be circulated through the passage-way to flush any moisture containing atmosphere away from the cage, the centering means therefor and the sealing ring carried thereby. In this way, the formation of ice on the centering means for the axially moveable sealing element is prevented. In addition, pump fluid is admitted to the area at the other side of the bellows or the like to prevent access of moisture to this vicinity.

Other objects and advantages of the invention will be hereinafter described or will become apparent to those skilled in the art, and the novel features thereof will be defined in the appended claims.

The accompanying drawing is a sectional view taken axially through a mechanical seal assembly embodying the invention and showing the seal assembly as applied to a rotatable pump shaft.

Like reference characters in the drawing and in the following description designate corresponding parts, wherein 1 denotes a rotary shaft adapted to be driven by an electric motor or other power source (not shown) having a supporting extension 2 in which the shaft 1 is journalled in a bearing 3. The free end of the shaft 1 projects into a pump housing 4 composed of inner and outer housing sections 5 and 6 respectively which are joined together at their outer peripheries as by means of a suitable number of bolts or screws as indicated at 7.

Within the pump housing 4 is a pump chamber 8 in which is rotatably mounted upon the shaft 1 a centrifugal pump rotor 9 of conventional form having a plurality of circumferentially spaced discharge orifices 9'. The rotor 9 is preferably keyed to the shaft 1 as at 10 and retained thereon by a cap nut 11. Conventional wear rings or bushings 10' are provided between the rotor 9 and both the inner and outer housing sections 5 and 6 of the pump housing 4.

The structure of the pump just described forms no part of the present invention but is more or less conventional. However, in accordance with the salient features of the invention, means are provided for preventing leakage of pump fluid from the housing 4 along the shaft 1. In this connection, the housing section 6 is provided on its outer side with an axially extended annular shell 12 which defines an internal seal chamber 13. Mounted in the seal chamber and upon the shaft 1 for rotation therewith is a circular sealing element 14 which is also conventional and which is preferably composed of stainless steel, bronze, or the like, this element 14 having a sealing surface 15 which is lapped to a mirror finish for cooperative engagement by a similarly lapped end face 16 of a seal ring 17 which is preferably composed of carbon or the like. Means are provided for supporting the seal ring 17 and urging the same into engagement with the sealing element 14. Such means preferably comprise an annular collar 18 having in its inner periphery a channel or groove 19 into which freely projects a marginal flange 20 of the seal ring 17. The collar 18 may be of unitary construction but is preferably composed of an annular plate 21 which has secured thereto at one side an annular part 22, these parts 21 and 22 preferably being composed of stainless steel and being suitably attached to one another as by means of a number of screw fasteners 23 so as to form or define the channel 19 therebetween.

The cross-sectional area of the flange 20 is less than the cross-sectional area of the channel 19, thus providing a free space. Interposed in this free space between the flange 20 of the seal ring 17 and the wall of the channel 19 on the collar part 22 is an annular "Belville" spring 24 which biases the seal ring 17 into sealing engagement with the wall of the channel 19 on the plate 21 of the collar 18. Thus the carbon seal ring 17 which has for practical purposes a zero coefficient of expansion is supported within the channel 19 of the collar 18 which is composed of a metal having a different coefficient of expansion, and the free space in which the "Belville" spring 24 is disposed enables expansion and contraction of the collar 18 responsive to temperature variations without adversely affecting the seal ring 17.

In order to urge the assembly comprising the collar 18 and the seal ring 17 axially to maintain sealing contact between the cooperative sealing surfaces 15 and 16 on the sealing element 14 and the seal ring 17, a coiled compression spring 25 is disposed about the shaft 1 and bears against the collar plate 21 at one end, and the other end of the spring 25 is backed up by a flange 26 which is secured to the shell 12 by means of a suitable number of screws 26', and which provides an end wall for the seal chamber 13 through which the shaft 1 extends.

Mounted in and carried by the flange 26 and extending axially in concentric relation to the shaft 1, is a centering sleeve 27. The sleeve 27 has an enlarged end 28 seating in a recess or seat 29 in the flange 26 and secured therein by means of a set screw 30 or the like. The other end of the sleeve 27 projects within the annular collar 18 so as to support and center the latter. To this end, the inner periphery of the collar plate 21 is provided with alternate notches and ribs 31 and 32, the ribs riding upon the outer periphery of the sleeve 27.

A portion of the pump fluid being discharged from the orifices 9' of the pump rotor 9 will flow through the inner wear rings or bushings 10' into the seal chamber 13. However, interposed between the axially extended spring 25 and the centering sleeve 27 is a suitable flexible element or diaphragm which is preferably in the form of a metallic bellows 33, this bellows being secured at one end to the collar plate 21 and at its other end to the flange 26. Thus any pump fluid passing through the inner wear rings or bushings 10' into the seal chamber 13 will be confined against leakage along the shaft by virtue of the sealing contact of the seal faces 15 and 16, sealing engagement of the contacting surfaces of the seal ring 17 and the collar plate 21, and the bellows 33, the latter serving as a partition. In addition, a sealing gasket or ring 34 is preferably interposed between the flange 26 and the end surface of the shell 12 to prevent loss of pump fluid therebetween. In order to enable circulation of pump fluid in the chamber 13, a return passage 8' is formed through the hub of the rotor 9, this passage 8' being subjected to pump suction.

Despite the fact that the pump fluid is contained in or circulated through the seal chamber, and the seal chamber is thereby flushed free of any moisture-containing atmosphere, it is particularly desirable and necessary when pumping liquid oxygen or nitrogen or other fluids during which pumping the apparatus is subjected to extreme sub-freezing temperatures, that the centering means for the mechanical sealing elements also be in a non-moisture containing environment. Accordingly, the flange 26 is provided with an inlet port 35 adapted to receive a fitting or tap 36 so that a dry gas (for instance nitrogen) may be caused to flow through the passage 35 and axially between the centering sleeve 27 and the bellows 33, through the notches 31 in the collar plate 21, and thence around the free end of the sleeve 27 and axially between the shaft 1 and the sleeve 27, all as indicated by the arrows. The flushing fluid is then free to pass through an outlet port 35' into an insulating space which will be hereinafter more fully described. Thus, the dry nitrogen will flush any moisture laden atmosphere from the seal so that the ribs 32 of the collar plate 21 which center the mechanical sealing ring 17 upon the sleeve 27 will not have any ice deposits thereon as would otherwise be caused upon condensation of moisture upon the seal parts. True centering of the mechanical sealing elements is thereby assured with attendant long life of the seal.

In order to further minimize the formation of ice upon the seal assembly and particularly upon the outer surface of the shell 12 and flange 26, an outer jacket 37 is preferably provided about the assembly, this jacket 37 being welded as at 38 or otherwise suitably secured at one end to an attachment flange 38' which is preferably secured to the pump housing 4 on the screws or studs 7. The other end of the jacket 37 is secured by welding or the like, as at 39, to an attachment flange 40 which in turn is secured by bolts or screws 41 to the extension 2 of the motor or other power source (not shown). The jacket 37 has an opening 42 through which the fitting or nipple 36 projects, and a suitable grommet 43 preferably seals the opening 42 against the passage of dry gas therethrough. Accordingly, an insulating space is provided between the jacket 37 and the seal assembly, this space being filled with dry gas which is pumped through the seal structure as aforesaid at relatively low pressure, say on the order of ten pounds p.s.i. Escape of dry gas from the insulating space is permitted through a labyrinth seal assembly generally designated 44 and through the bearing 3 so as to aid in maintaining the bearing free of ice deposits.

In the light of the foregoing, it will be noted that an improved pump and mechanical sealing assembly has been provided which is eminently suited for use where liquid oxygen or nitrogen or other fluids are being pumped and wherein the seal parts are subjected to relatively low sub-freezing temperatures which would tend to cause the formation of ice upon the seal parts and the surrounding structure. The structure hereof is particularly suited for such installations by virtue of the fact that the sealing elements which are composed of different metals are capable of differential expansion and contraction responsive to temperature changes without adversely affecting the operability or longevity of the seal and the fact that the sealing elements, and more particularly the centering means for the seal ring 17, may be continuously bathed in the pump fluid at one side and in a dry gas at the other side so as to flush the same free of any moisture-containing atmosphere.

While the specific details of the invention have been herein shown and described, changes and alterations may be resorted to without departing from the spirit thereof as defined in the appended claims.

I claim:

1. In a mechanical seal assembly comprising a shell having a seal chamber therein, a rotatable shaft projecting axially through said chamber, cooperative mechanical sealing means for sealing the chamber between said shell and said shaft against the leakage of fluid along said shaft, including a sealing element rotatable with said shaft and having a radially extended sealing surface, a sealing ring disposed adjacent to said sealing element for axial movement and having a radially extended sealing surface, means for biasing said sealing ring axially toward said sealing element to effect engagement of said sealing faces, and means supporting said sealing ring, that improvement wherein the supporting means for said sealing ring includes a sleeve carried by said shell and encircling said shaft in spaced relation thereto, a collar encircling said sleeve and centered on said sleeve, said collar having a peripheral channel, said sealing ring having a portion disposed in said channel for supporting the sealing ring in said channel, the side walls of said channel being spaced apart a distance greater than the thickness of said portion of said sealing ring, and resilient means interposed between said portion of said sealing ring and one side wall of said channel urging said portion of said sealing ring into engagement with the other side wall of said channel.

2. In a mechanical seal assembly comprising a shell having a seal chamber therein, a rotatable shaft projecting axially through said chamber, cooperative mechanical sealing means for sealing the chamber between said shell and said shaft against the leakage of fluid along said shaft, including a sealing element rotatable with said shaft and having a radially extended sealing surface, a sealing ring disposed adjacent to said sealing element for axial movement and having a radially extended sealing surface, means for biasing said sealing ring axially toward said sealing element to effect engagement of said sealing faces, and means supporting said sealing ring, that improvement wherein the supporting means for said sealing ring includes a sleeve carried by said shell and encircling said shaft in spaced relation thereto, a collar encircling said sleeve and centered on said sleeve, said collar having a peripheral channel, and said sealing ring having a portion disposed in said channel for supporting the sealing ring in said channel, the side walls of said channel being spaced apart a distance greater than the thickness of said portion of said sealing ring, resilient means interposed between said portion of said sealing ring and one side wall of said channel urging said portion of said sealing ring into engagement with the other side wall of said channel, and means encircling said sleeve for preventing the passage of fluid from said chamber between said shell and said collar.

3. In a mechanical seal assembly comprising a shell having a seal chamber therein, a rotatable shaft projecting axially through said chamber, cooperative mechanical sealing means for sealing the chamber between said shell and said shaft against the leakage of fluid along said shaft, including a sealing element rotatable with said shaft and having a radially extended sealing surface, a sealing ring disposed adjacent to said sealing element for axial movement and having a radially extended sealing surface, means for biasing said sealing ring axially toward said sealing element to effect engagement of said sealing faces, and means supporting said sealing ring, that improvement wherein the supporting means for said sealing ring includes a sleeve carried by said shell and encircling said shaft in spaced relation thereto, a collar encircling said sleeve and centered on said sleeve, said collar having a peripheral channel, and said sealing ring having a portion disposed in said channel for supporting the sealing ring in said channel, the side walls of said channel being spaced apart a distance greater than the thickness of said portion of said sealing ring, resilient means interposed between said portion of said sealing ring and one side wall of said channel urging said portion of said sealing ring into engagement with the other side wall of said channel, a flexible element encircling said sleeve and sealed to said collar for preventing the passage of fluid from said chamber between said shell and said collar, and means for admitting a flushing fluid into the space between said flexible element and said sleeve and into the space between said sleeve and said shaft.

4. In a mechanical seal assembly comprising a shell having a seal chamber therein, a rotatable shaft projecting axially through said chamber, cooperative mechanical sealing means for sealing the chamber between said shell and said shaft against the leakage of fluid along said shaft, including a sealing element rotatable with said shaft and having a radially extended sealing surface, a sealing ring disposed adjacent to said sealing element for axial movement and having a radially extended sealing surface, means for biasing said sealing ring axially toward said sealing element to effect engagement of said sealing faces, and means supporting said sealing ring, that improvement wherein the supporting means for said sealing ring includes a sleeve carried by said shell and encircling said shaft in spaced relation thereto, a collar encircling said sleeve and centered on said sleeve, said collar having a peripheral channel, and said sealing ring having a portion disposed in said channel for supporting the sealing ring in said channel, a flexible element encircling said sleeve and sealed to said collar for preventing the passage of fluid from said chamber between said shell and said collar, and means for admitting a flushing fluid into the space between said flexible element and said sleeve and into the space between said sleeve and said shaft, said collar having passages therethrough to enable passage of said flushing fluid along said sleeve past said collar.

5. A mechanical seal assembly as defined in claim 4, in combination with a jacket encircling the shell and providing an insulating space between said shell and said jacket.

6. A mechanical seal assembly of the class described, comprising a housing wall having a seal chamber therein, a rotatable shaft extending through said chamber, said shaft having thereon for rotation therewith a radially extended sealing element, a relatively stationary sealing ring disposed adjacent to said sealing element for sealing contact therewith, supporting means for said sealing ring, means cooperative with said supporting means and defining therewith a flushing fluid flow path, and means for admitting a flushing fluid to said flow path to flush the same, means about said housing defining an insulating space, said flushing fluid flow path opening into said insulating space, and means for allowing pressure responsive escape of said flushing fluid from said insulating space.

7. A mechanical seal assembly as defined in claim 6, wherein said sealing ring supporting means includes a sleeve encircling said shaft, and centering means for the sealing ring engageable with the outer periphery of said sleeve, said centering means being disposed in said flushing fluid path so as to be subjected to a flushing action by the flushing fluid.

8. A device of the class described for handling fluids under sub-freezing temperature conditions, comprising a pump housing, said housing having a seal chamber in fluid communication with the pump housing, a rotatable shaft extending through said seal chamber for connection to a power source, sealing means in said chamber for preventing the passage of pump fluid from said chamber along said shaft, said sealing means defining a flushing fluid passage between said sealing means and the shaft, means for directing a flushing fluid to said passage, said sealing means including a pair of relatively rotatable sealing elements having contacting seal faces, one of said elements being on said shaft for rotation therewith, the other of said elements being relatively stationary, and means for centering said relatively stationary element on said shaft, said centering means being disposed in said flushing fluid passage, said centering means comprising a sleeve encircling said shaft in spaced relation thereto, said sleeve being carried by said housing and extending into said seal chamber, said relatively stationary sealing element being centered on said sleeve.

9. A device of the class described for handling fluids under sub-freezing temperature conditions, comprising a pump housing, said housing having a seal chamber in fluid communication with the pump housing, a rotatable shaft extending through said seal chamber for connection to a power source, sealing means in said chamber for preventing the passage of pump fluid from said chamber along said shaft, said sealing means defining a flushing fluid passage between said sealing means and the shaft, means for directing a flushing fluid to said passage, said sealing means including a pair of relatively rotatable sealing elements having contacting seal faces, one of said elements being on said shaft for rotation therewith, the other of said elements being relatively stationary, and means for centering said relatively stationary element on said shaft, said centering means being disposed in said flushing fluid passage, said centering means comprising an annular collar having a peripheral channel, said relatively stationary sealing element having the form of a ring, said ring having a peripheral portion disposed in said channel for supporting the ring on the collar, said peripheral ring portion having a cross-sectional area less than the cross-sectional area of said channel for enabling differential expansion and contraction of said collar and said ring.

10. A device of the class described for handling fluids under sub-freezing temperature conditions, comprising a pump housing, said housing having a seal chamber in fluid communication with the pump housing, a rotatable shaft extending through said seal chamber for connection to a power source, sealing means in said chamber for preventing the passage of pump fluid from said chamber along said shaft, said sealing means defining a flushing fluid passage between said sealing means and the shaft, means for directing a flushing fluid to said passage, said sealing means including a pair of relatively rotatable sealing elements having contacting seal faces, one of said elements being on said shaft for rotation therewith, the other of said elements being relatively stationary, and means for centering said relatively stationary element on said shaft, said centering means being disposed in said flushing fluid passage, said centering means comprising an annular collar having a peripheral channel, said relatively stationary sealing element having the form of a ring, said ring having a peripheral portion disposed in said channel for supporting the ring on the collar, said peripheral ring portion having a cross-sectional area less than the cross-sectional area of said channel for enabling differential expansion and contraction of said collar and said ring, and resilient means for maintaining said peripheral ring portion in engagement with said collar at one side of said channel.

11. A device of the class described for handling fluids under sub-freezing temperature conditions, comprising a pump housing, said housing having a seal chamber in fluid communication with the pump housing, a rotatable shaft extending through said seal chamber for connection to a power source, sealing means in said chamber for preventing the passage of pump fluid from said chamber along said shaft, said sealing means defining a flushing fluid passage between said sealing means and the shaft, means for directing a flushing fluid to said passage, said sealing means including a pair of relatively rotatable sealing elements having contacting seal faces, one of said elements being on said shaft for rotation therewith, the other of said elements being relatively stationary, and means for centering said relatively stationary element on said shaft, said centering means being disposed in said flushing fluid passage, said centering means comprising a sleeve encircling said shaft in spaced relation thereto, said sleeve being carried by said housing and extending into said seal chamber, said relatively stationary sealing element being centered on said sleeve, said centering means also comprising an annular collar having a peripheral channel, said relatively stationary sealing element having the form of a ring, said ring having a peripheral portion disposed in said channel for supporting the ring on the collar, said peripheral ring portion having a cross-sectional area of less than the cross-sectional area of said channel for enabling differential expansion and contraction of said collar and said ring.

12. A device of the class described for handling fluids under sub-freezing temperature conditions, comprising a pump housing, said housing having a seal chamber in fluid communication with the pump housing, a rotatable shaft extending through said seal chamber for connection to a power source, sealing means in said chamber for preventing the passage of pump fluid from said chamber along said shaft, said sealing means defining a flushing fluid passage between said sealing means and the shaft, means for directing a flushing fluid to said passage, said sealing means including a pair of relatively rotatable sealing elements having contacting seal faces, one of said elements being on said shaft for rotation therewith, the other of said elements being relatively stationary, and means for centering said relatively stationary element on said shaft, said centering means being disposed in said flushing fluid passage, said centering means comprising an annular centering plate, a member secured to said plate and defining therewith a channel, said relatively stationary sealing element having the form of a ring, said ring being supported in said channel, said channel being of greater cross-sectional area than the cross-sectional area of the ring disposed in said channel for enabling differential expansion and contraction of said ring and said centering means.

13. A device of the class described for handling fluids under sub-freezing temperature conditions, comprising a pump housing having a seal chamber in fluid communication with the pump housing, a rotatable shaft extending through said seal chamber, sealing means in said chamber for preventing the passage of pump fluid from said chamber along said shaft, said sealing means defining a flushing fluid passage between said sealing means and the shaft, means for directing a flushing fluid to said passage, said sealing means including a pair of relatively rotatable sealing elements having contacting seal faces, one of said elements being on said shaft for rotation therewith, the other of said elements being relatively stationary, and means for centering said relatively stationary element on said shaft, said centering means being disposed in said flushing fluid passage, and an outer jacket defining with said housing an insulating space, said flushing fluid passage communicating with said insulating space to fill the latter with flushing fluid.

14. In a mechanical seal assembly including a member having a seal chamber therein, a rotatable shaft extending through said chamber and a rotatable seal element disposed in said chamber and connected to said shaft for rotation therewith, means cooperative with said member and said element for preventing the passage of fluid through said chamber along said shaft, said means including an annular flange disposed about said shaft and secured to said member, a sleeve carried by said flange and extending into said chamber in spaced relation about said shaft, non-rotatable sealing means carried by said flange and disposed about said sleeve adjacent to said sealing element, said sealing means including a collar and a sealing ring carried by said collar and engaged with said element, means centering said collar and said sealing ring within said chamber, said flange having a flushing fluid passageway communicating with said chamber, means coengaged with said collar and disposed about said sleeve for defining a flushing fluid passageway leading externally of said sleeve towards said sealing ring, and said sleeve being disposed in spaced relation to said shaft and forming a flushing fluid passageway leading between said sleeve and said shaft externally of the chamber.

References Cited in the file of this patent

UNITED STATES PATENTS

| | | |
|---|---|---|
| 2,049,774 | Hoffman | Aug. 4, 1936 |
| 2,100,220 | King | Nov. 23, 1937 |
| 2,275,680 | Myers | Mar. 10, 1942 |
| 2,464,136 | Jenkins | Mar. 8, 1949 |
| 2,586,297 | Brummer | Feb. 19, 1952 |
| 2,610,075 | Haake | Sept. 9, 1952 |
| 2,632,395 | Jennings et al. | Mar. 24, 1953 |
| 2,732,126 | Smith | Jan. 24, 1956 |
| 2,791,991 | Disbrow | Apr. 17, 1956 |
| 2,794,399 | Murphy | June 4, 1957 |

FOREIGN PATENTS

| | | |
|---|---|---|
| 60,219 | Sweden | Feb. 9, 1926 |
| 501,574 | Belgium | Mar. 15, 1951 |
| 520,921 | Belgium | July 15, 1953 |
| 748,827 | Great Britain | May 6, 1956 |